US012105448B2

(12) United States Patent
De-Shalit et al.

(10) Patent No.: US 12,105,448 B2
(45) Date of Patent: Oct. 1, 2024

(54) INTERMEDIATE TRANSFER MEMBER CLEANING

(71) Applicant: Hewlett-Packard Development Company, L.P., Spring, TX (US)

(72) Inventors: Omer De-Shalit, Ness Ziona (IL); Doron Schlumm, Ness Ziona (IL); Mark Sandler, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/251,126

(22) PCT Filed: Oct. 29, 2020

(86) PCT No.: PCT/US2020/057833

§ 371 (c)(1),
(2) Date: Apr. 28, 2023

(87) PCT Pub. No.: WO2022/093222

PCT Pub. Date: May 5, 2022

(65) Prior Publication Data

US 2024/0012346 A1 Jan. 11, 2024

(51) Int. Cl.

| | |
|---|---|
| ***G03G 15/16*** | (2006.01) |
| ***G03G 21/00*** | (2006.01) |
| ***G03G 21/10*** | (2006.01) |

(52) U.S. Cl.

CPC ......... *G03G 15/161* (2013.01); *G03G 15/168* (2013.01); *G03G 21/0058* (2013.01); *G03G 2215/1661* (2013.01)

(58) Field of Classification Search

CPC ............... G03G 15/161; G03G 15/168; G03G 21/0058; G03G 21/10; G03G 2215/1661

See application file for complete search history.

(56) References Cited

U.S. PATENT DOCUMENTS

| | | | |
|---|---|---|---|
| 4,530,596 | A | 7/1985 | Kawamoto et al. |
| 7,274,898 | B2 | 9/2007 | Nousho et al. |
| 7,374,851 | B2 | 5/2008 | Nakayama et al. |
| 7,997,717 | B2 | 8/2011 | Taniuchi et al. |

(Continued)

FOREIGN PATENT DOCUMENTS

| | | | | |
|---|---|---|---|---|
| EP | 1449660 A1 * | 8/2004 | ............. B41F 35/00 |
| JP | 58-142367 A | 8/1983 | |

(Continued)

*Primary Examiner* — Sophia S Chen
(74) *Attorney, Agent, or Firm* — Jordan IP Law, LLC

(57) ABSTRACT

In an example of the disclosure, an intermediate transfer member cleaning system includes an intermediate transfer member ("blanket"), an endless cleaning surface, and a pyrolysis station. The blanket is to receive a thermoplastic print agent from a photoconductive element. The endless cleaning surface can be positioned to rotatably engage with the blanket to transfer a residue of the thermoplastic print agent from the blanket to the endless cleaning surface. The endless cleaning surface can be moved away from the blanket to enter a pyrolysis station. The pyrolysis station is for receiving the endless cleaning surface, for heating the endless cleaning surface to convert the residue to ash, and for removing the ash.

15 Claims, 15 Drawing Sheets

(56) References Cited

U.S. PATENT DOCUMENTS

| | | | |
|---|---|---|---|
| 9,186,884 | B2 | 11/2015 | Landa et al. |
| 9,827,759 | B2 | 11/2017 | Doyle et al. |
| 9,937,734 | B2 | 4/2018 | Beier et al. |

FOREIGN PATENT DOCUMENTS

| | | | | |
|---|---|---|---|---|
| JP | 04-251884 | A | 9/1992 | |
| JP | 3819634 | B2 | 9/2006 | |
| WO | 2019/076451 | A1 | 4/2019 | |
| WO | WO-2020027803 | A1 * | 2/2020 | ........... G03G 15/161 |

* cited by examiner

INTERMEDIATE TRANSFER MEMBER CLEANING

BACKGROUND

A printer may apply print agents to a paper or another substrate. One example of a printer is a Liquid Electro-Photographic ("LEP") printer, which may be used to print using a fluid print agent such as an electrostatic printing fluid. Such electrostatic printing fluid includes electrostatically charged or chargeable particles (for example, resin or toner particles which may be colorant particles) dispersed or suspended in a carrier fluid).

DRAWINGS

DETAILED DESCRIPTION

Figure 1:
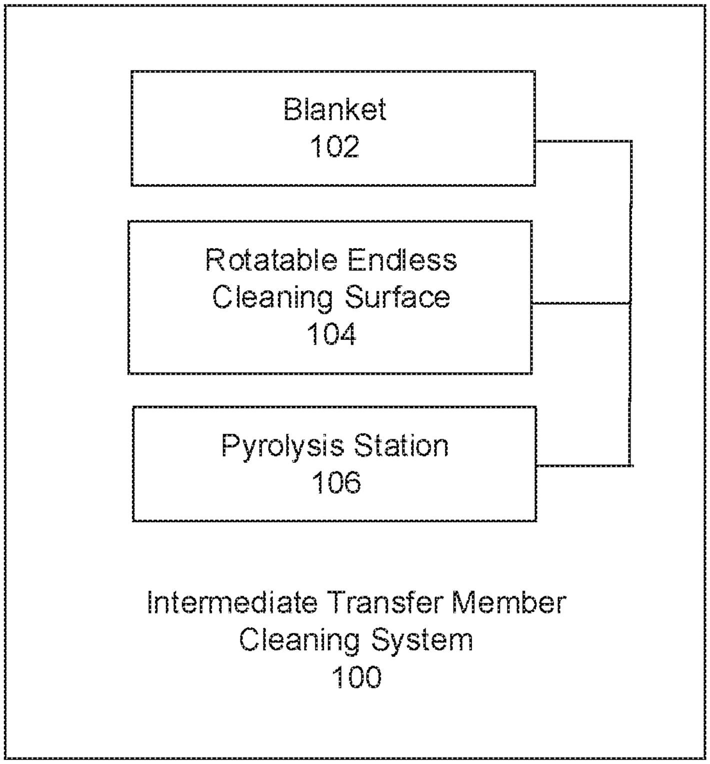
FIG. 1 is a block diagram depicting an example of an intermediate transfer member cleaning system.

In an example of LEP printing, a printer system may form an image on a print substrate by placing an electrostatic charge on a photoconductive element, and then utilizing a laser scanning unit to apply an electrostatic pattern of the desired image on the photoconductive element to selectively discharge the photoconductive element. The selective discharging forms a latent electrostatic image on the photoconductive element. The printer system includes a development station to develop the latent image into a visible image by applying a thin layer of electrostatic print fluid (which may be generally referred to as "LEP print fluid", or "electronic print fluid", "LEP ink", or "electronic ink" in some examples) to the patterned photoconductive element. Charged particles (sometimes referred to herein as "print fluid particles" or "colorant particles") in the LEP print fluid adhere to the electrostatic pattern on the photoconductive element to form a print fluid image. In examples, the print fluid image, including colorant particles and carrier fluid, is transferred utilizing a combination of heat and pressure from the photoconductive element to an intermediate transfer member (sometimes referred herein as a "blanket") attached to a rotatable blanket drum. The blanket is heated until carrier fluid evaporates and colorant particles melt, and a resulting molten film representative of the image is then applied to the surface of the print substrate via pressure and tackiness. In examples the blanket that is attached to the blanket drum is a consumable or replaceable blanket.

For printing with colored print fluids, the printer system may include a separate development station for each of the various colored print fluids. There are typically two process methods for transferring a colored image from the photoreceptor to the substrate. One method is a multi-shot process method in which the process described in the preceding paragraph is repeated a distinct printing separation for each color, and each color is transferred sequentially in distinct passes from the blanket to the substrate until a full image is achieved. With multi-shot printing, for each separation a molten film (with one color) is applied to the surface of the print substrate. A second method is a one-shot process in which multiple color separations are acquired on the blanket via multiple applications (each with one color) from the photoconductive element to the blanket, and then the acquired color separations are transferred in one pass as a molten film from the blanket to the substrate.

A significant challenge in LEP printing is that the blanket held by the blanket drum is prone to contamination. After a number of transfers have taken place from the photoconductive element to the blanket, and subsequent transfers from the blanket to a substrate, contaminants such as print agent residue, dust, machine oil and the like will build up on the surface of the blanket. The accumulation of such contaminants on the blanket can greatly reduce print quality.

To address these issues, various examples described in more detail below provide a system and a method that enables cleaning and servicing of an intermediate transfer member to remove accumulated contaminants. In an example of the disclosure, an intermediate transfer member cleaning system includes a blanket to receive a thermoplastic print agent from a photoconductive element, a rotatable endless cleaning surface, and a pyrolysis station. The rotatable endless cleaning surface can be positioned to rotatably engage with the blanket to transfer a residue of the thermoplastic print agent from the blanket to the rotatable endless cleaning surface. The rotatable endless cleaning surface can be moved away from the blanket into the pyrolysis station. The pyrolysis station is to receive the rotatable endless cleaning surface, and is to cause the rotatable endless cleaning surface to be heated to convert the residue to an ash, and is to cause a removal of the ash from the pyrolysis station.

In an example, the rotatable endless cleaning surface is a roller that is rotatably mounted upon a roller axis, with the roller being movable in a first direction to cause the roller to move away from the blanket and into the pyrolysis station. In this example the roller is movable in a second direction to cause the roller to move from the pyrolysis station to rotatably engage with the blanket.

In another example, the rotatable endless cleaning surface is a cleaning element that is rotatably mounted upon a first roller and a second roller. The first and second rollers are movable in a first direction to cause the cleaning element to move to a chamber of the pyrolysis station. The first and second rollers are movable in a second direction to cause the cleaning element to contact the blanket.

In an example, the pyrolysis station includes a chamber and a heating element positioned within the chamber. The heating element is for converting the residue to ash while the rotatable endless cleaning surface is within the chamber.

In an example, the pyrolysis station includes a chamber with a door, the door to be opened to receive the rotatable endless cleaning surface into the chamber, and the door to be closed to at least partially enclose the rotatable endless cleaning surface within the chamber during the time the rotatable endless cleaning surface is heated to convert the residue to ash. In an example a heating element is positioned within the door. In another example, the heating element is positioned within the chamber, but separate from the door.

In an example, the rotatable endless cleaning surface is a surface that has been heated to between 100 degrees C. and 200 degrees C. during a residue collection mode wherein the endless cleaning surface is at a residue collection position, and to between 400 degrees C. and 600 degrees C. during a pyrolysis mode wherein the endless cleaning surface is at a pyrolysis position. In certain examples, a surface of the rotatable endless cleaning surface includes a coating of a catalytic material. In these certain examples, the rotatable endless cleaning surface with the coating of catalytic material may be heated to a temperature between 300 degrees C. and 500 degrees C. during the pyrolysis mode.

In an example, the pyrolysis station includes an ash evacuation component for removing a portion of the ash that has formed upon the rotatable endless cleaning surface during the pyrolytic heating of the rotatable endless cleaning surface at the pyrolysis station. In examples, the pyrolysis station may include an evacuation component that is fan or other blower apparatus. In examples, the pyrolysis station may include an evacuation component that is a vacuum apparatus. In examples, the pyrolysis station may include an air knife apparatus for dislodging a portion of the ash that has formed portion upon the rotatable endless cleaning surface, such the dislodged portion may in turn be removed by the ash collection component.

In this manner the disclosed apparatus and method enables use of a roller or other rotatably mounted rotatable endless cleaning surface for blanket cleaning, in conjunction with an efficient pyrolytic cleaning process to clean the roller and thereby refresh the roller for further cleaning of the blanket. The disclosed method and system enable frequent, or in some examples continuous, blanket cleaning with minimal consumables usage and without interruption to the printing process or costumer workflow. Users and providers of LEP printer systems and other printer systems will appreciate the improvements in print quality, the ability to clean the blanket and the blanket-cleaning roller frequently and without disrupting the printing process, longer blanket life, and ease in collecting accumulated blanket residue that are afforded by utilization of the disclosed examples. Installations and utilization of printers that include the disclosed apparatus and methods should thereby be enhanced.

FIG. 1 illustrates an example of a system 100 for cleaning intermediate transfer members. In this example, system 100 includes a blanket 102, a rotatable endless cleaning surface (sometimes referred to as a "RECS") 104, and a pyrolysis station 106. The blanket is to receive a thermoplastic print agent from a photoconductive element. As used herein the term "blanket" is used interchangeably with "intermediate transfer member" and refers generally to a member that can receive print agent in the form of a developed image from a photoconductive element, and in turn transfer the developed image to a substrate.

As used herein, the term "print agent" refers generally to any material to any substance that can be applied upon a media by a printer during a printing operation at a printing apparatus, including but not limited to aqueous inks, solvent inks, UV-curable inks, dye sublimation inks, latex inks, liquid electro-photographic inks, liquid or solid toners, powders, primers, and overprint materials (such as a varnish). As used herein, an "ink" refers generally to any fluid that is to be applied to a substrate during a printing operation to form an image upon the substrate. In examples, the print agent that is transferred by the blanket from the photoconductive element to the substrate is a thermoplastic ink. As used herein, the term "thermoplastic" refers generally to a polymer that becomes pliable or moldable above a specific temperature and solidifies upon cooling. Polyethylene, polypropylene, polyvinyl chloride, polystyrene, polybenzimidazole, acrylic, nylon and Teflon are examples of thermoplastics.

As used herein a "photoconductive element" refers generally to a material or a device that becomes more electrically conductive as it is exposed to electromagnetic radiation (e.g., visible light, ultraviolet light, infrared light, or gamma radiation). In examples the photoconductive element at a printing apparatus may be to receive print agent from one or more developer assemblies that disposed adjacent to the photoconductive element and may correspond to various print fluid colors such as cyan, magenta, yellow, black, and the like. At a printing apparatus there may be one developer assembly for each print fluid color. In other examples, e.g., black and white printing, a single developer assembly may be utilized for providing print agent to the photoconductive element. During printing at a printing apparatus, the appropriate developer assembly is engaged with the photoconductive element and is to present a uniform film of print fluid to the photoconductive element. In examples, the print fluid contains electrically charged pigment particles which are attracted to the opposing charges on the image areas of the photoconductive element. As a result, the photoconductive element has a developed image on its surface, i.e. a pattern of print fluid corresponding with the electrostatic charge pattern (also sometimes referred to as a "separation").

In certain examples, the photoconductive element at a printing apparatus may be attached to a rotatably mounted drum and the blanket may be attached to another rotatably mounted drum, wherein the drums are arranged such that the photoconductive element and the blanket are each rotate and abut one another throughout the rotations. In other examples, the blanket may in the form of a belt and may be movably held or supported by two or more rollers.

The RECS is positioned to rotatably engage with the blanket to transfer a residue of the thermoplastic print agent from the blanket to the RECS. As used herein, "residue" on a blanket refers generally to a substance that remains at the blanket after the blanket has been used to transfer print agent, e.g., print agent in the form of a developed image, to a substrate. In examples, the residue may include leftover print agent, paper dust, varnish, colorant, and/or resin.

In examples, the RECS is a steel or other metallic surface. In other examples, the RECS may be or include a non-metallic surface that does not deform at the temperatures achieved in causing the residue to turn to an ash. The RECS is positioned such that it can be moved away from the blanket into a pyrolysis station. The pyrolysis station is for receiving the RECS, and is to cause the RECS to be heated to a temperature sufficient to convert the residue formed on the RECS to ash. The pyrolysis station is also to cause a removal of the ash from the pyrolysis station.

In examples, the RECS is in form of a roller that is rotatably mounted upon a roller axis, with the roller axis movable in a first direction to cause the roller to move away from the blanket and into the pyrolysis station. In these examples the roller axis is movable in a second direction to cause the roller to move from the pyrolysis station to rotatably engage with the blanket.

In other examples, the RECS is a cleaning element that is rotatably mounted upon a first roller and a second roller. In certain of such examples the RECS may or include a belt or web. The first and second rollers are movable in a first direction to move the RECS away from the blanket to enter a chamber of the pyrolysis station, and are movable is a second direction to cause the RECS to contact the blanket for blanket cleaning.

Figure 2:
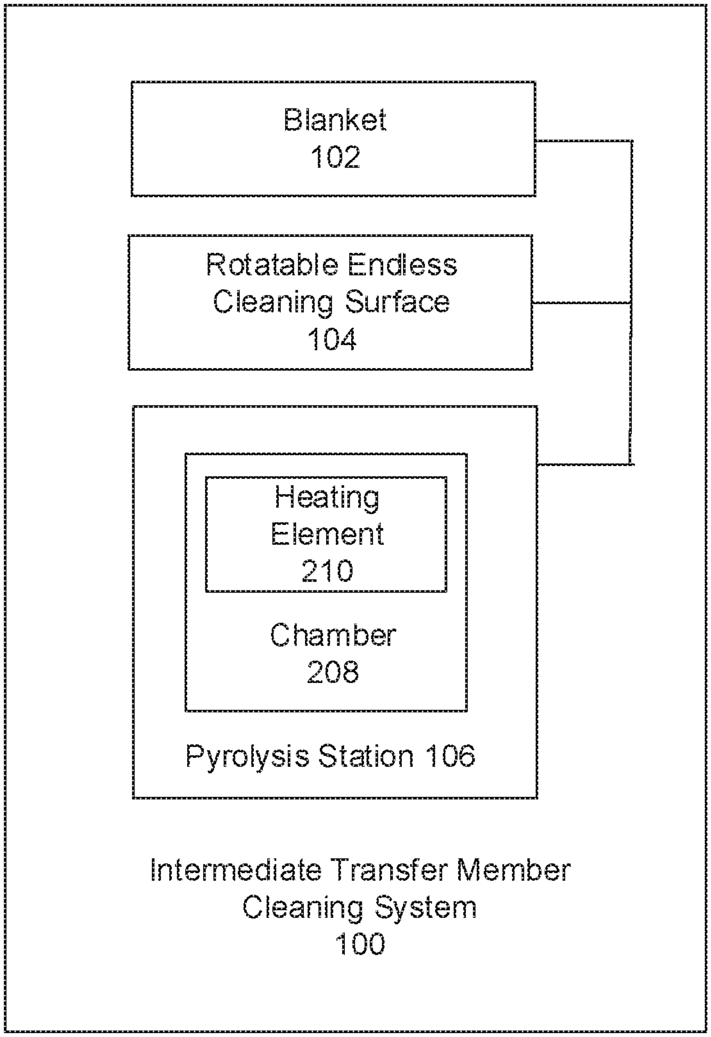
FIG. 2 is block diagram depicting another example of an intermediate transfer member cleaning system.

Moving to FIG. 2, in examples of the intermediate transfer member cleaning system 100 the pyrolysis station 106 includes a chamber 208 and a heating element 210 positioned within the chamber 208. The heating element 210 is for converting the residue to ash while the RECS 104 is within the chamber ("a pyrolysis heating mode"). In examples, the heating element is to heat the RECS to a temperature between 400 degrees C. and 600 degrees C. during the pyrolysis mode wherein the RECS is at a pyrolysis position. In examples, this pyrolysis heating mode temperature is significantly higher than the temperature of the RECS when it is used to remove the residue from the blanket ("a residue collection mode"). In examples, the RECS 104 is heated to between 100 degrees C. and 200 degrees C. during the residue collection mode wherein the RECS is at a residue collection position.

Figure 3:
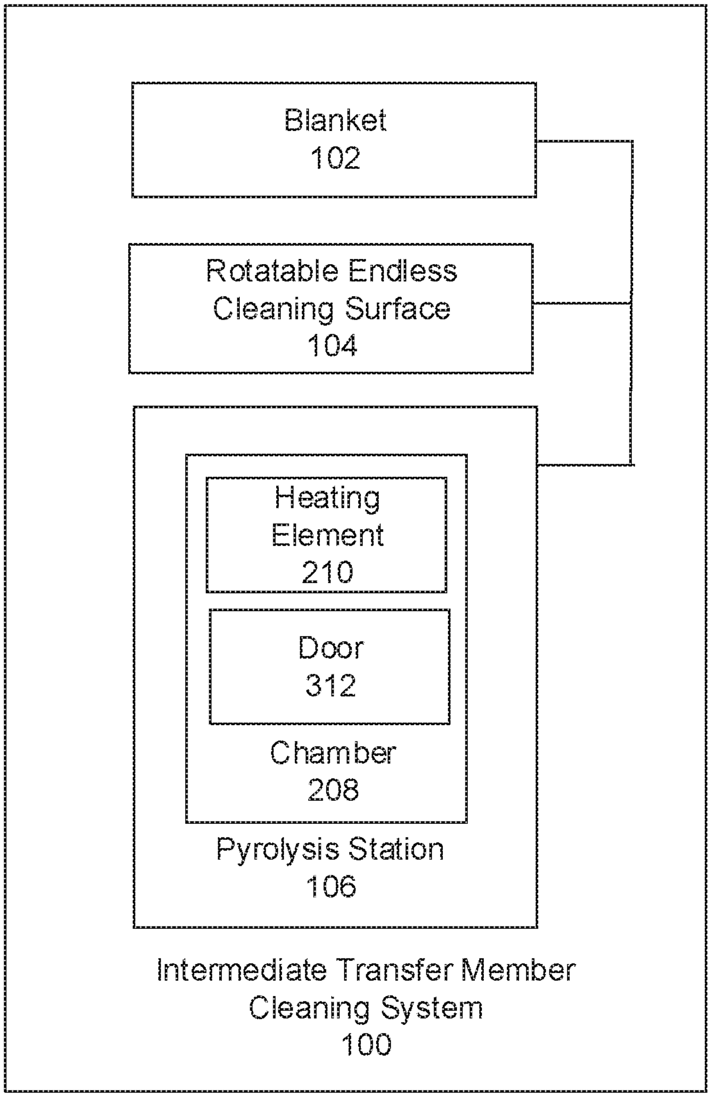
FIG. 3 is block diagram depicting another example of an intermediate transfer member cleaning system.

Moving to FIG. 3, in examples of the intermediate transfer member cleaning system 100 the pyrolysis station 106 includes a chamber 208 with a door 312. The door is movable to an open position allow the RECS 104 to be received into the chamber 208. This door 312 is movable to a closed position wherein the RECS 104 is at least partially enclosed within the chamber 208, during which time the RECS 104 is heated to convert the residue to ash. In an example the door may by slidable to a position adjacent to a floor of the pyrolytic chamber to make the chamber accessible to the RECS. In other examples, the door may open inward or outward to make the chamber accessible to the RECS.

Figure 4:
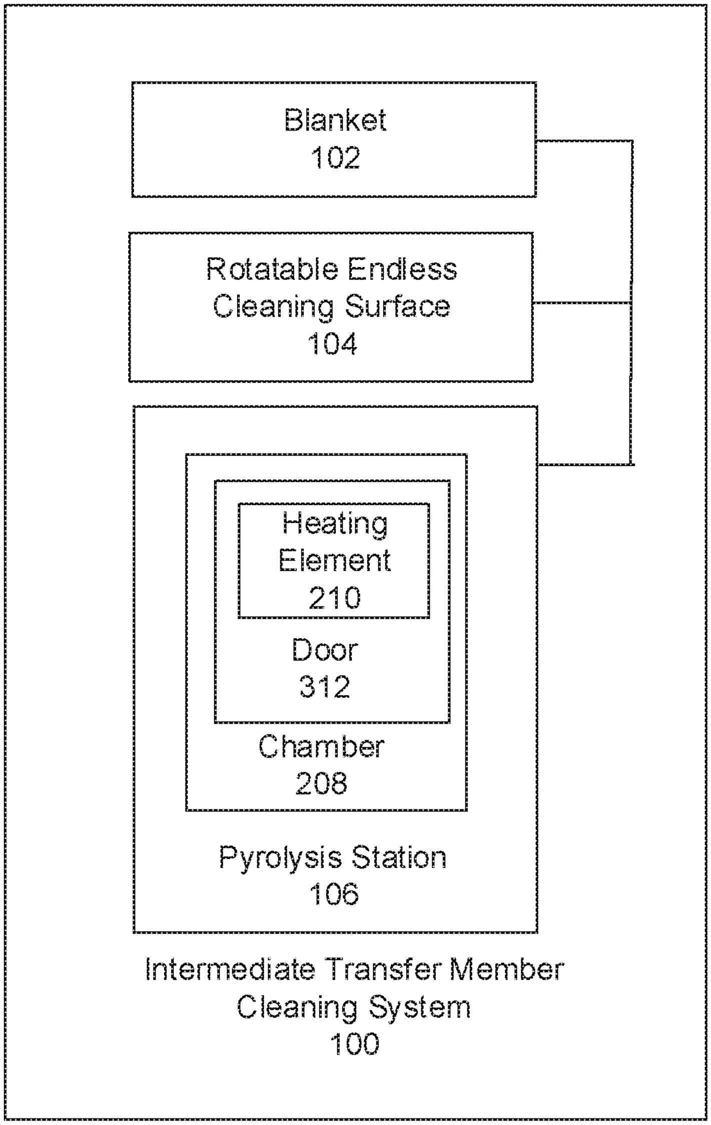
FIG. 4 is block diagram depicting another example of an intermediate transfer member cleaning system.

Moving to FIG. 4, in examples of system 100 the pyrolysis station 106 includes a includes a chamber 208 with a door 312, with a heating element 210 positioned within the door 312. The heating element in the door is for converting the residue to ash while the RECS 104 is contained within the chamber 208. In examples the heating element 210 may be completely positioned within the door structure. In other examples, the heating element 210 may be partially positioned within the door 312, e.g., such that a portion of the heating element protrudes out of the door and into the chamber 208 when the door is closed.

Figure 5:
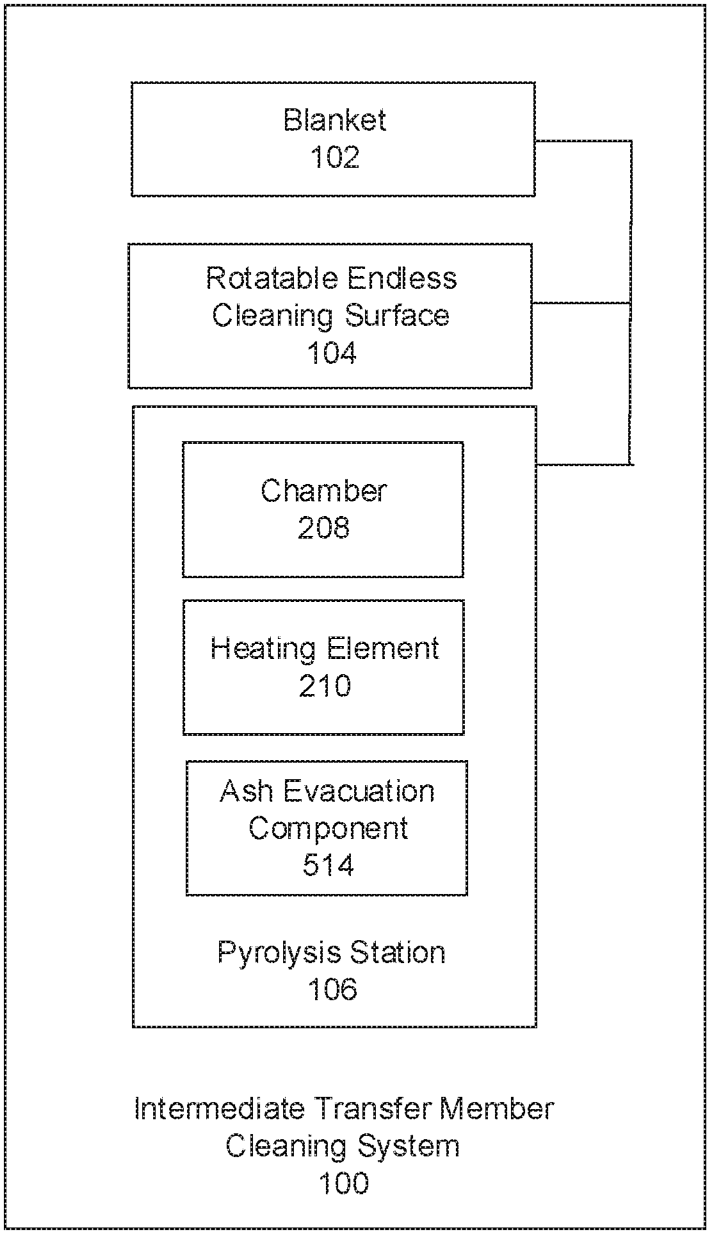
FIG. 5 is block diagram depicting another example of an intermediate transfer member cleaning system.

Moving to FIG. 5, in examples the pyrolysis station 106 includes an ash evacuation component 514 for removing a portion of the ash that has formed upon the RECS 104 during the pyrolytic heating of the RECS at the pyrolysis station. In examples, the ash evacuation component 514 may be or include a fan or blower for removing ash from the RECS 104 and/or the chamber 208. In examples, the ash evacuation component 514 may be or include a vacuum apparatus for removing the ash from the RECS and/or the chamber 208. In examples, the ash evacuation component 514 may be or include an air knife apparatus for causing removal of ash from the RECS 104. As used herein, an "air knife apparatus" refers generally to a system for directing a focused, high pressure stream of air towards an element to remove residue or debris from the element. In examples, the air knife apparatus is positioned such that the air flow from the air knife apparatus is in a direction opposite or semi-opposite the direction of rotation of the endless cleaning element. In examples, the ash evacuation element (s) (fan/blower apparatus, vacuum apparatus, and/or air knife apparatus) are operated after the heating element 210 has caused the residue to be turned to ash.

Figure 6:
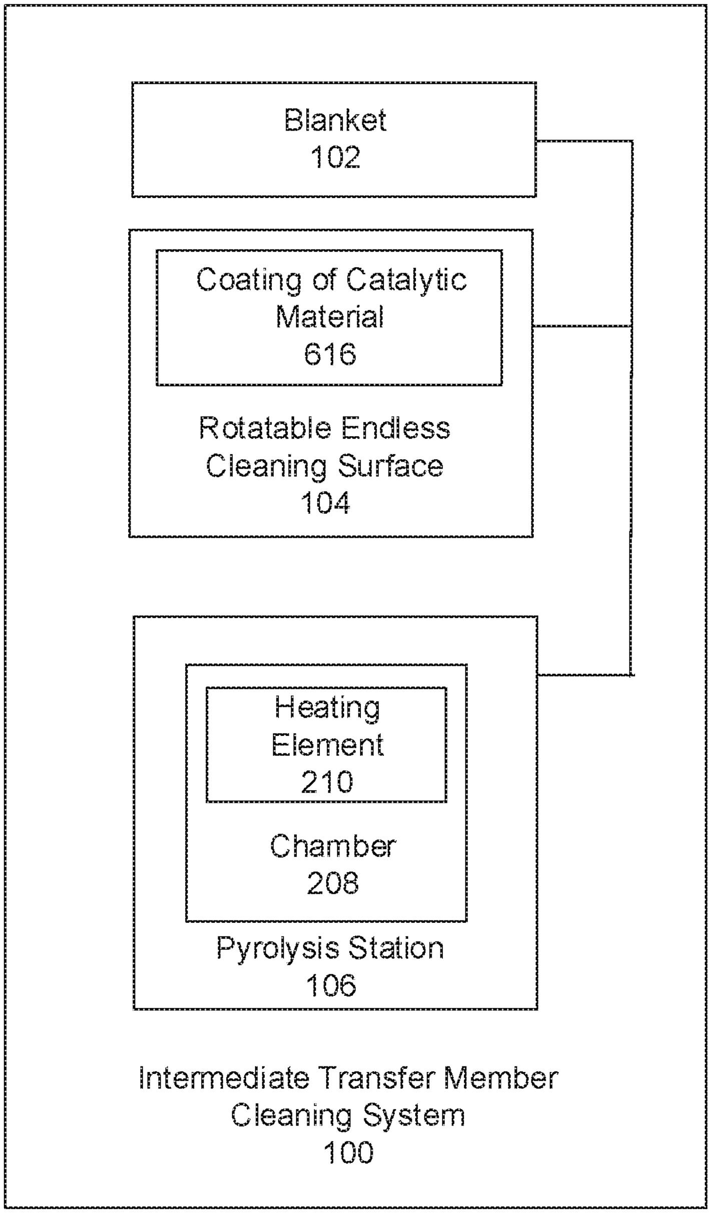
FIG. 6 is block diagram depicting another example of an intermediate transfer member cleaning system.

Moving to FIG. 6, in examples of the intermediate transfer member cleaning system 100, a surface of the RECS includes a coating of a catalytic material 616. In examples, this surface is the outer surface of the RECS that is to engage the blanket to clean the residue from the blanket. In examples, the catalytic material may be or include a mixture of platinum group metals and be applied over a washcoat material consisting of alumina, cerin and other inorganic oxides. The washcoat material may include inorganic base metal oxides such as $Al_2O_3$ (aluminum oxide or alumina), $SiO_2$, $TiO_2$, $CeO_2$, $ZrO_2$, $V_2O_5$, $La_2O_3$ and zeolites. In examples, the washcoat material is to adhere to a metallic surface of the RECS, creating a surface area to which the catalytic material can be applied.

In examples the presence of the catalytic coating 616 upon the RECS allows for the heating element 210 of the pyrolysis station 106 to convert the residue collected on the RECS to ash at lower temperatures than would be utilized when the RECS has a steel or other metallic surface without an outward-facing catalytic layer. In examples, the heating element 210 is to cause the RECS 104 with an exterior coating of catalytic material 616 to be heated to a temperature between 300 degrees C. and 500 degrees C. to convert the residue to an ash during a pyrolysis mode wherein the RECS is at a pyrolysis position.

Figure 7:
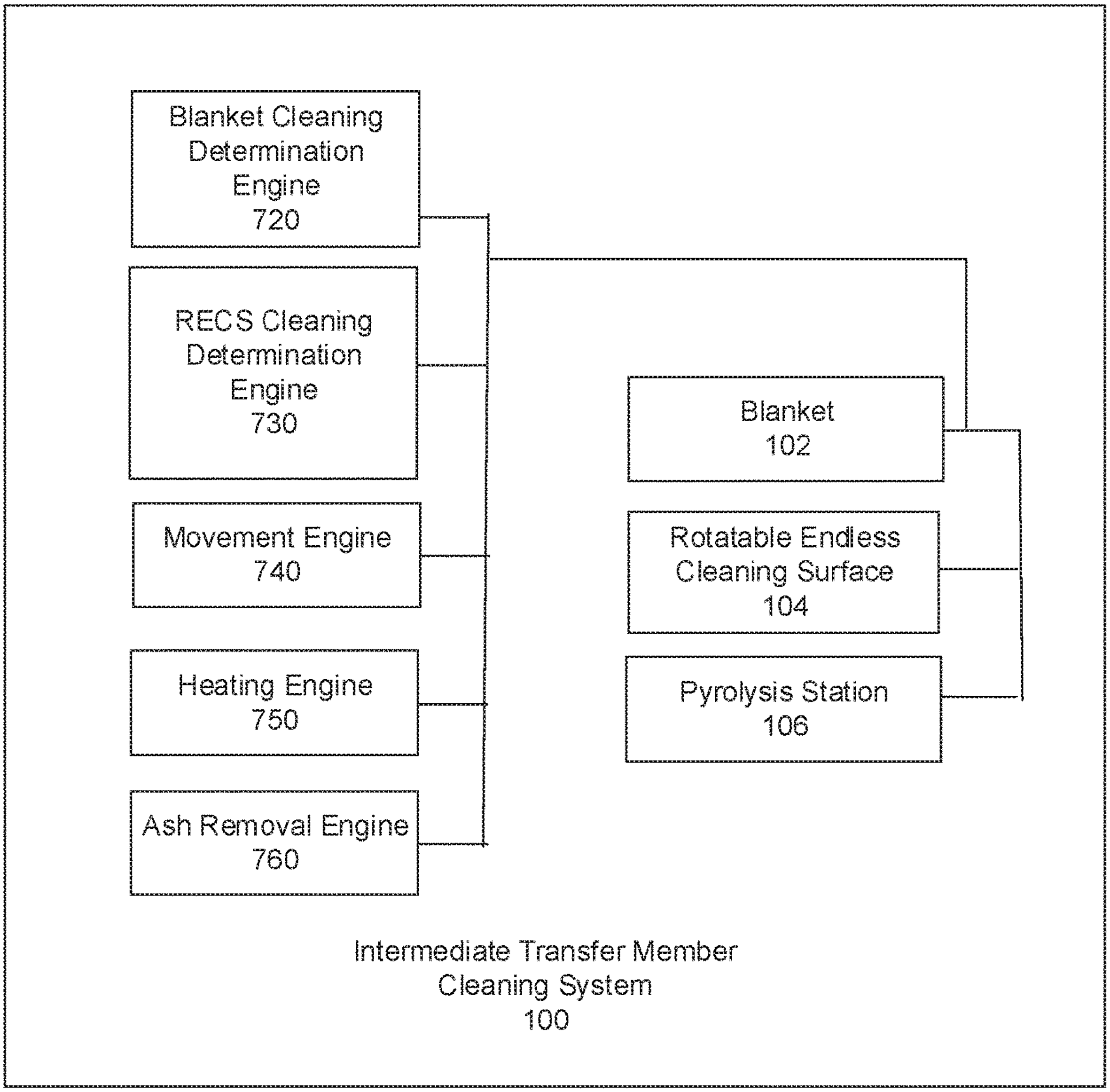
FIG. 7 is block diagram depicting another example of an intermediate transfer member cleaning system.

FIG. 7 depicts an example of physical and logical components for implementing various examples. In FIG. 7 various components are identified as engines 720, 730, 740, 750, and 760. In describing engines 720, 730, 740, 750, and 760 focus is on each engine's designated function. However, the term engine, as used herein, refers generally to hardware and/or programming to perform a designated function. As is illustrated later with respect to FIG. 8, the hardware of each engine, for example, may include one or both of a processor and a memory, while the programming may be code stored on that memory and executable by the processor to perform the designated function.

FIG. 7 illustrates an example of a system 100 for cleaning an intermediate transfer medium. In this example, system 100 includes a blanket 102, a rotatable endless cleaning surface 104, a pyrolysis station 106, a blanket cleaning determination engine 720, a rotatable endless cleaning surface cleaning determination engine 730, a movement engine 740, a heating engine 750, and an ash removal engine 760. In performing their respective functions, blanket cleaning determination engine 720, RECS cleaning determination engine 730, movement engine 740, heating engine 750, ash removal engine 760 may access a data repository, e.g., a memory accessible to system 100 that can be used to store and retrieve data.

In the example of FIG. 7, a blanket cleaning determination engine 720 represents generally a combination of hardware and programming to determine that an indication that cleaning of the blanket 102 is to be carried out is present. In an example, the indication may an indication of condition of the blanket 102 that takes into consideration readings of an optical sensor adjacent to the blanket. In another example, the indication may an indication of condition of the blanket 102 that takes into consideration a number of print routines or a time elapsed since a last cleaning of the blanket. In response to this determination, blanket cleaning determination engine 720 causes heating of the RECS 104, and causes the RECS to engage with the blanket 102 to remove residue from the blanket and thereby clean the blanket.

RECS cleaning determination engine 730 represents generally a combination of hardware and programming to determine that an indication that cleaning of the RECS 104 is to be carried out is present. In an example, the indication may an indication of condition of the RECS 104 that takes into consideration readings of an optical sensor adjacent to the RECS. In another example, the indication may an indication of condition of the RECS 104 that takes into consideration a count of the times the RECS has been utilized for cleaning the blanket, or a time elapsed since a last cleaning of the RECS 104. In response to a positive determination that cleaning of the RECS 104 is to be carried out, the RECS 104 is moved away from the blanket 102 to enter a chamber of a pyrolysis station Movement engine 740 is to cause the RECS to move away from the blanket 102 to enter a chamber of the pyrolysis station 106. Heating engine 750 is to cause the RECS to be heated within the chamber to convert the residue collected on the RECS to ash. Ash removal engine 760 is to cause removal of the ash from the RECS to prepare the RECS for a next cleaning engagement with the blanket. In examples, the ash removal engine 760 may also cause removal of ash from a floor of the chamber, and/or a wall of the chamber, thereby preparing the chamber and pyrolysis station for a next cleaning round of cleaning of the RECS 104.

In the foregoing discussion of FIG. 7, engines 720, 730, 740, 750, and 760 were described as combinations of hardware and programming. Engines 720, 730, 740, 750, and 760 may be implemented in a number of fashions. Looking at FIG. 8 the programming may be processor executable instructions stored on a tangible memory resource 880 and the hardware may include a processing resource 890 for executing those instructions. Thus, memory resource 880 can be said to store program instructions that when executed by processing resource 890 implement system 100 of FIG. 7.

Memory resource 880 represents generally any number of memory components capable of storing instructions that can be executed by processing resource 890. Memory resource 880 is non-transitory in the sense that it does not encompass a transitory signal but instead is made up of a memory component or memory components to store the relevant instructions. Memory resource 880 may be implemented in a single device or distributed across devices. Likewise, processing resource 890 represents any number of processors capable of executing instructions stored by memory resource 880. Processing resource 890 may be integrated in a single device or distributed across devices. Further, memory resource 880 may be fully or partially integrated in the same device as processing resource 890, or it may be separate but accessible to that device and processing resource 890.

In one example, the program instructions can be part of an installation package that when installed can be executed by processing resource 890 to implement system 100. In this case, memory resource 880 may be a portable medium such as a CD, DVD, or flash drive or a memory maintained by a server from which the installation package can be downloaded and installed. In another example, the program instructions may be part of an application or applications already installed. Here, memory resource 880 can include integrated memory such as a hard drive, solid state drive, or the like.

Figure 8:
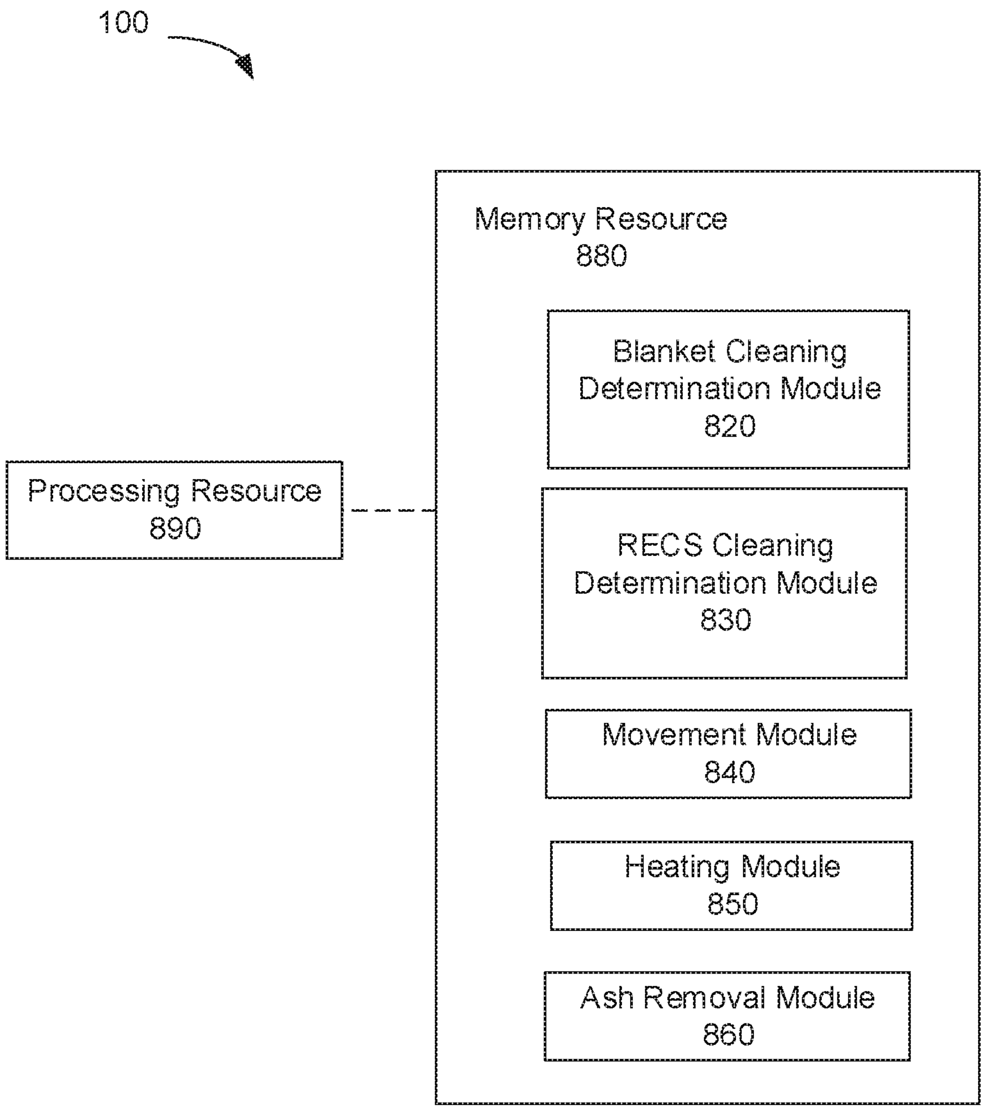
FIG. 8 is a block diagram depicting a memory resource and a processing resource to implement an example of a method for cleaning an intermediate transfer member.

In FIG. 8, the executable program instructions stored in memory resource 880 are depicted as a blanket cleaning determination module 820, a rotatable endless cleaning surface cleaning determination module 830, a movement module 840, a heating module 850, and an ash removal module 860. Blanket cleaning determination module 820 represents program instructions that when executed by processing resource 890 may perform any of the functionalities described above in relation to blanket cleaning determination engine 720 of FIG. 7. RECS cleaning determination module 830 represents program instructions that when executed by processing resource 890 may perform any of the functionalities described above in relation to RECS cleaning determination engine 730 of FIG. 7. Movement module 840 represents program instructions that when executed by processing resource 890 may perform any of the functionalities described above in relation to movement engine 740 of FIG. 7. Heating module 850 represents program instructions that when executed by processing resource 890 may perform any of the functionalities described above in relation to heating engine 750 of FIG. 7. Ash removal module 860 represents program instructions that when executed by processing resource 890 may perform any of the functionalities described above in relation to ash removal engine 760 of FIG. 7.

Figure 9:
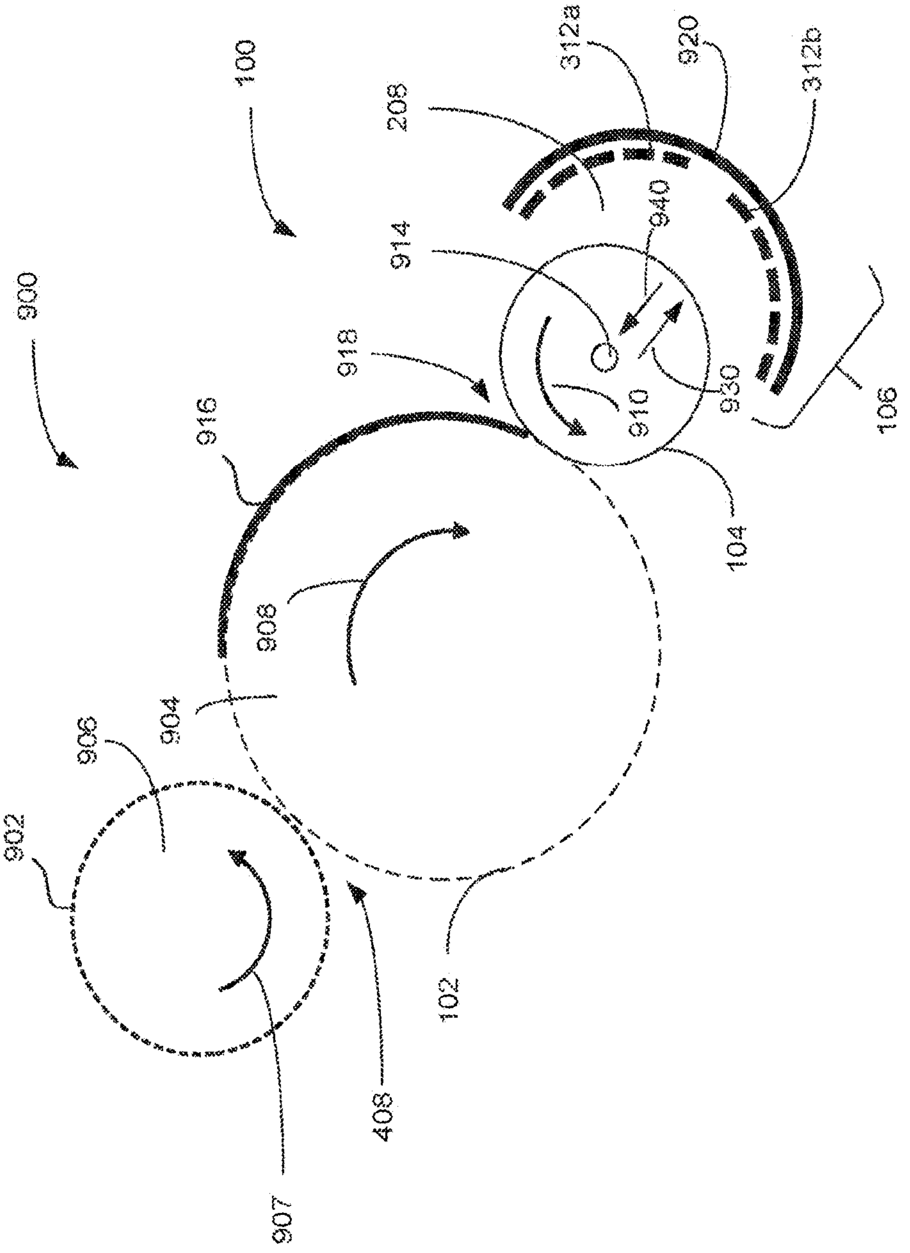
FIGS. 9 and 10 are simple schematic diagrams that illustrate an example of a print apparatus with an intermediate transfer member cleaning system.
Figure 10:
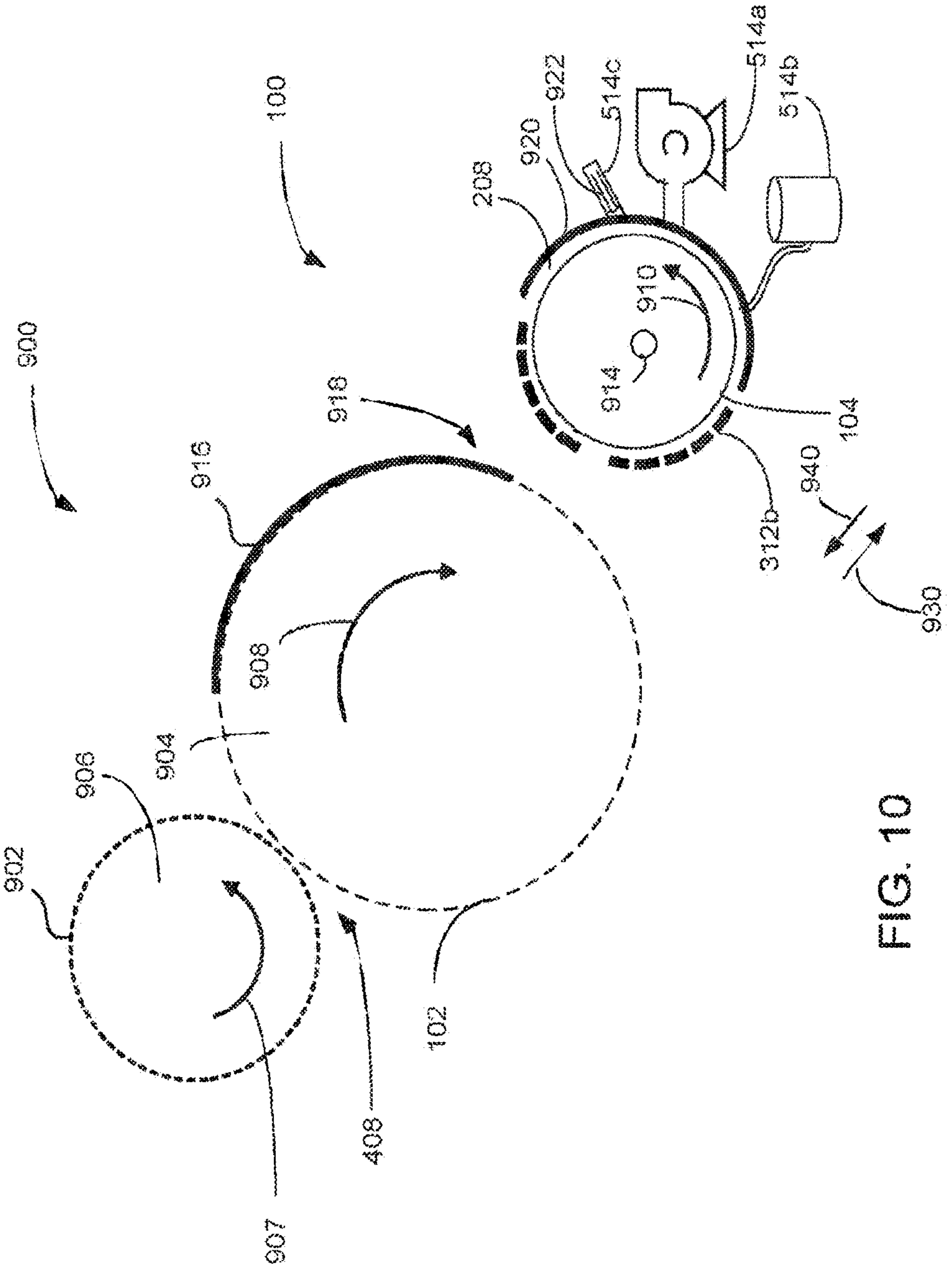

FIGS. 9 and 10 are simple schematic diagrams that illustrate an example of a print apparatus with an intermediate transfer member cleaning system 100. Beginning at FIG. 9, in this example, a blanket 102 is to receive a thermoplastic print agent from a photoconductive element 902 of a print apparatus 900. In the example, the blanket 102 and photoconductive element 902 have endless surfaces as each is each mounted on a drum (blanket drum 904 and photoconductive element drum 906). A first nip 408 is formed as the blanket 102 and the photoconductive element 902 rotate in opposite directions (direction 907 and direction 908 respectively) in contact with one another.

Continuing at FIG. 9, system 100 includes a rotatably mounted RECS 104 that is in the form of a roller with a roller axis 914 and is to be positioned to rotatably engage with the blanket 102 at a second nip 918 to transfer a residue 916 of the thermoplastic print agent from the blanket 102 to the RECS 104. In other examples, the RECS 104 may be a metallic or non-metallic sheet that wrapped around a cleaning surface drum that is to rotate around a drum axis 914. In the example of FIG. 9, the roller axis 914 is movable in a first direction 930 to cause the roller RECS 104 to move away from the blanket 102 and into a chamber 208 of the pyrolysis station 106. In the example of FIG. 9, the roller axis 914 is movable in a second direction 940 to cause the roller to move from the chamber 208 of the pyrolysis station 106 to rotatably engage with the blanket 102. Second nip 918 is formed as the blanket 102 and the rotatably mounted RECS 104 rotate in opposite directions (direction 908 and direction 910 respectively) in contact with one another.

In some examples, the transfer of the residue from the blanket 102 to the RECS 104 shall be transfer from the blanket to a layer of print fluid that is held upon the RECS 104. In other examples, the transfer of the residue to the RECS 104 shall be a transfer from the blanket directly to the RECS 104.

Continuing at FIG. 9, the intermediate transfer member cleaning system 100 includes a pyrolysis station 106 with a chamber 208, a first door 312*a*, and a second door 312*b*. At FIG. 9 the first and second doors are retracted to an open position that is adjacent to a wall 920 of the chamber 208.

Moving to FIG. 10, in this view the RECS 104 has been moved away from the blanket 102 to enter the chamber 208 of the pyrolysis station 106. The pyrolysis station 106 has thus received the RECS 104, and closed the first and second doors 312*a* 312*b* around the RECS 104 to at least partially enclose the RECS 104. The pyrolysis station 106 is then to cause the RECS 104 to be heated to convert the residue that was transferred from the blanket 102 to the RECS to ash. In this example the first and second doors 312*a* 312*b* of the pyrolysis station 106 include heating elements that are to cause the pyrolytic heating of the RECS 104.

The pyrolysis station 106 is to cause a removal of the ash. In this example, ash evacuation components (FIG. 5, 514) that are a blower apparatus 514*a*, a vacuum apparatus 514*b*, and an air knife apparatus 514*c* are utilized in removing the ash from the RECS 104 and interior of the wall 920 that at least partially defines the chamber 208 of the pyrolysis station. In examples, the vacuum apparatus 514*c* may be or include any component or system that is to apply a negative pressure. In examples, the vacuum source may be, but is not limited to, a mechanical vacuum pump or a Venturi-type vacuum generator. In examples, the vacuum source may include a consumable filter. The air knife apparatus 514*c* is for dislodging a portion of the ash that has formed portion upon the RECS 104, such the dislodged portion may in turn be removed by the blower apparatus 514*a* and the vacuum apparatus 514*b*. The air knife apparatus 514*c* is positioned such that the air flow from the air knife is in a direction 922 opposite or semi-opposite the direction 910 of rotation of the endless cleaning element 104. In examples, the ash evacuation elements 514*a* 514*b* 514*c* are operated after the heating element has caused the residue to be turned to ash. In an example the speed of rotation of the RECS 104 during the ash evacuation process is slower that the speed of rotation while the RECS abuts the blanket 102 to clean the blanket 102, in order to improve the collection of ash by the ash evacuation components.

FIG. 9 depicts the RECS 104 in a residue collection position wherein the RECS is engaged or can engage with the blanket 102 to receive a residue from the blanket. FIG. 10 depicts the RECS 104 in a pyrolysis position wherein the RECS is at least partially enclosed within the chamber 208 of the pyrolysis station 106.

Figure 11:
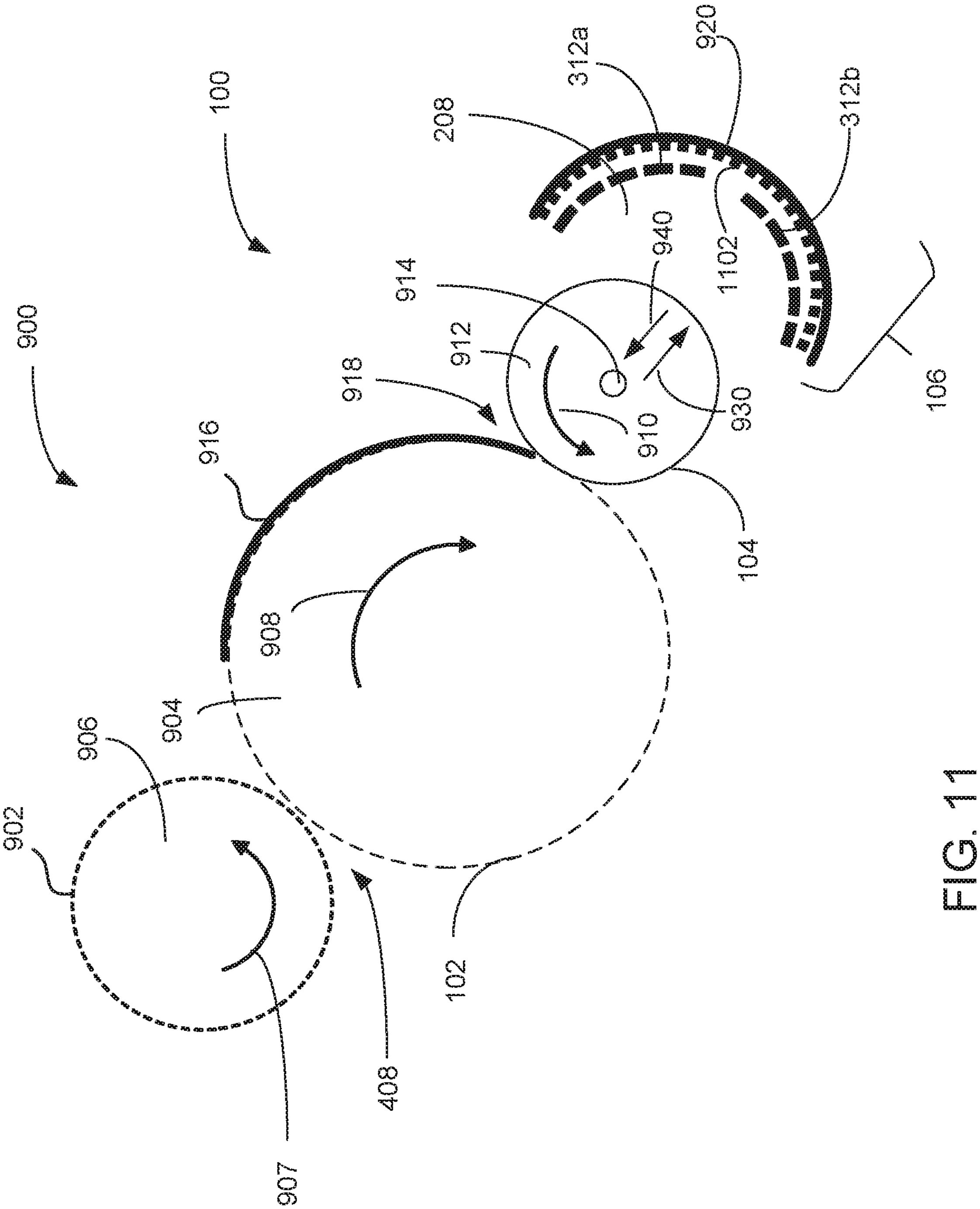
FIGS. 11 and 12 are simple schematic diagrams that illustrate another example of a print apparatus with an intermediate transfer member cleaning system.
Figure 12:
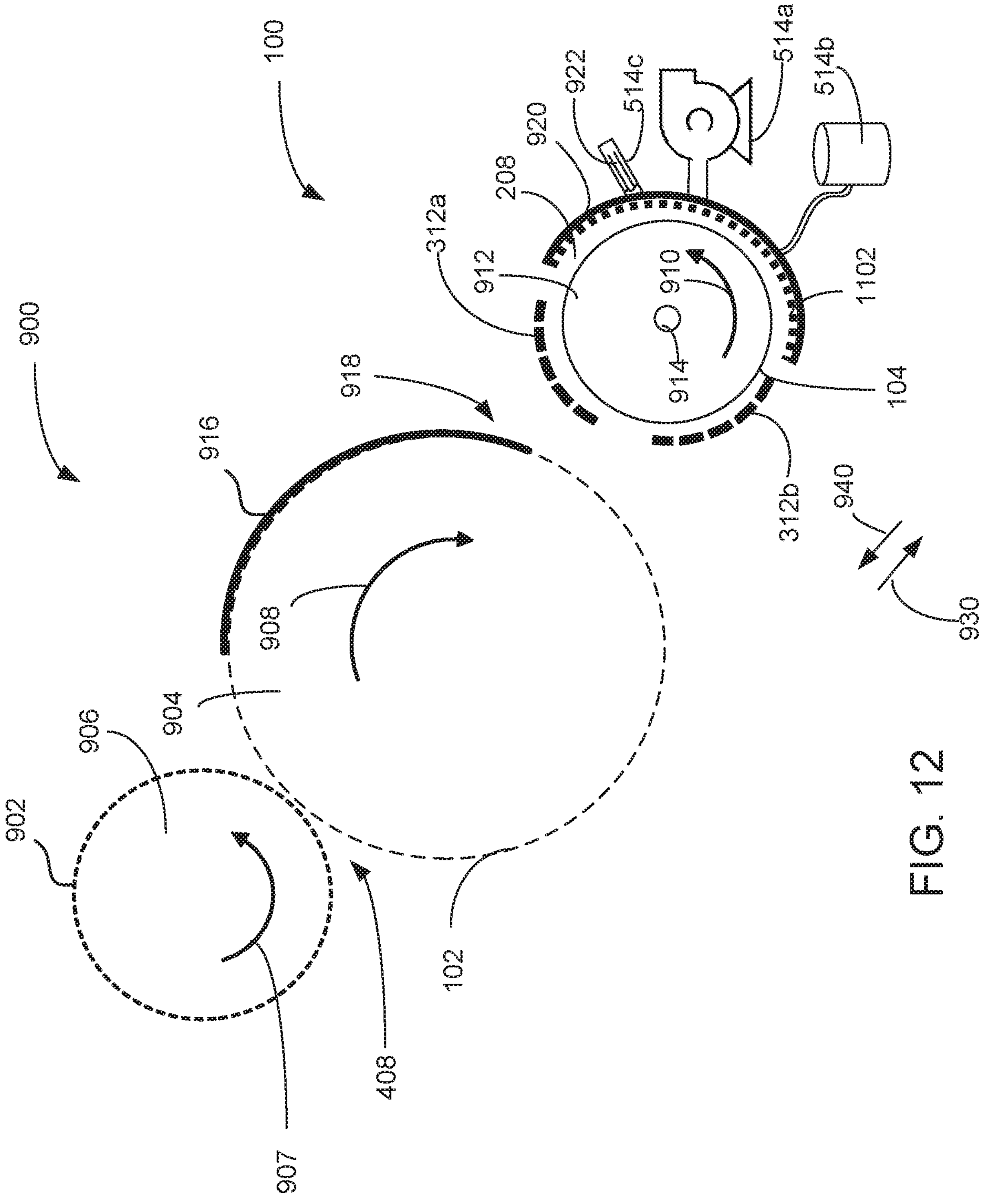

FIGS. 11 and 12 are simple schematic diagrams that illustrate another example of a print apparatus with an intermediate transfer member cleaning system 100. The print apparatus 900 and system 100 at FIGS. 11 and 12 are substantially the same as the print apparatus 900 and system 100 of FIGS. 9 and 10 discussed above, except that the heating element 1102 of FIGS. 11 and 12 is not a heating element that is embedded in the first and second doors 312*a* 312*b* as was described in the example of FIGS. 9 and 10. In this example, the heating element 1102 is positioned within the chamber 208 of the pyrolysis station 106, but separate from the first and second doors 312*a* 312*b*.

FIG. 11 depicts the RECS 104 in a residue collection position wherein the RECS is engaged or can engage with the blanket 102 to receive a residue from the blanket, FIG. 12 depicts the RECS 104 in a pyrolysis position wherein the RECS is at least partially enclosed within the chamber 208 of the pyrolysis station 106.

Figure 13:
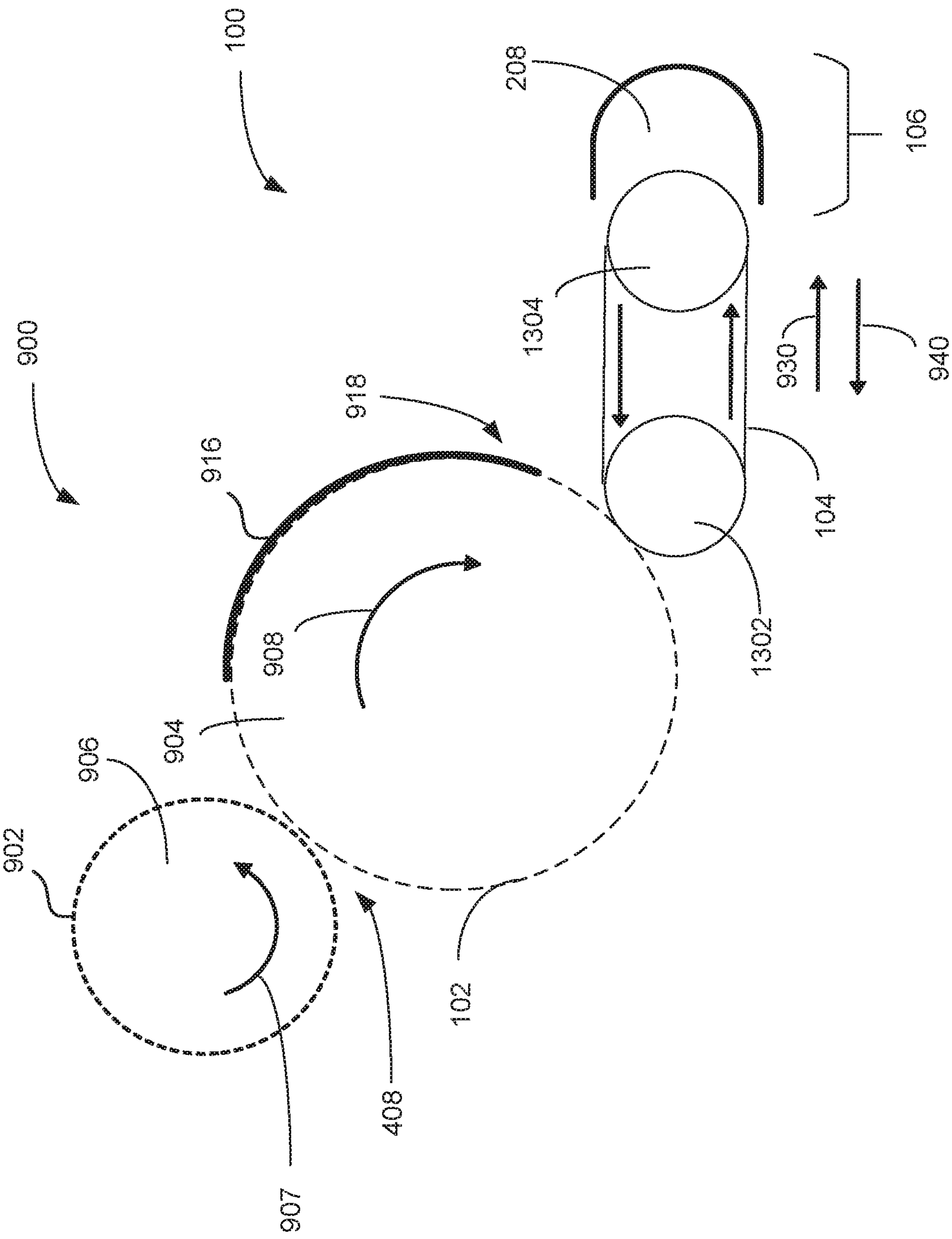
FIGS. 13 and 14 are simple schematic diagrams that illustrate another example of a print apparatus with an intermediate transfer member cleaning system.
Figure 14:
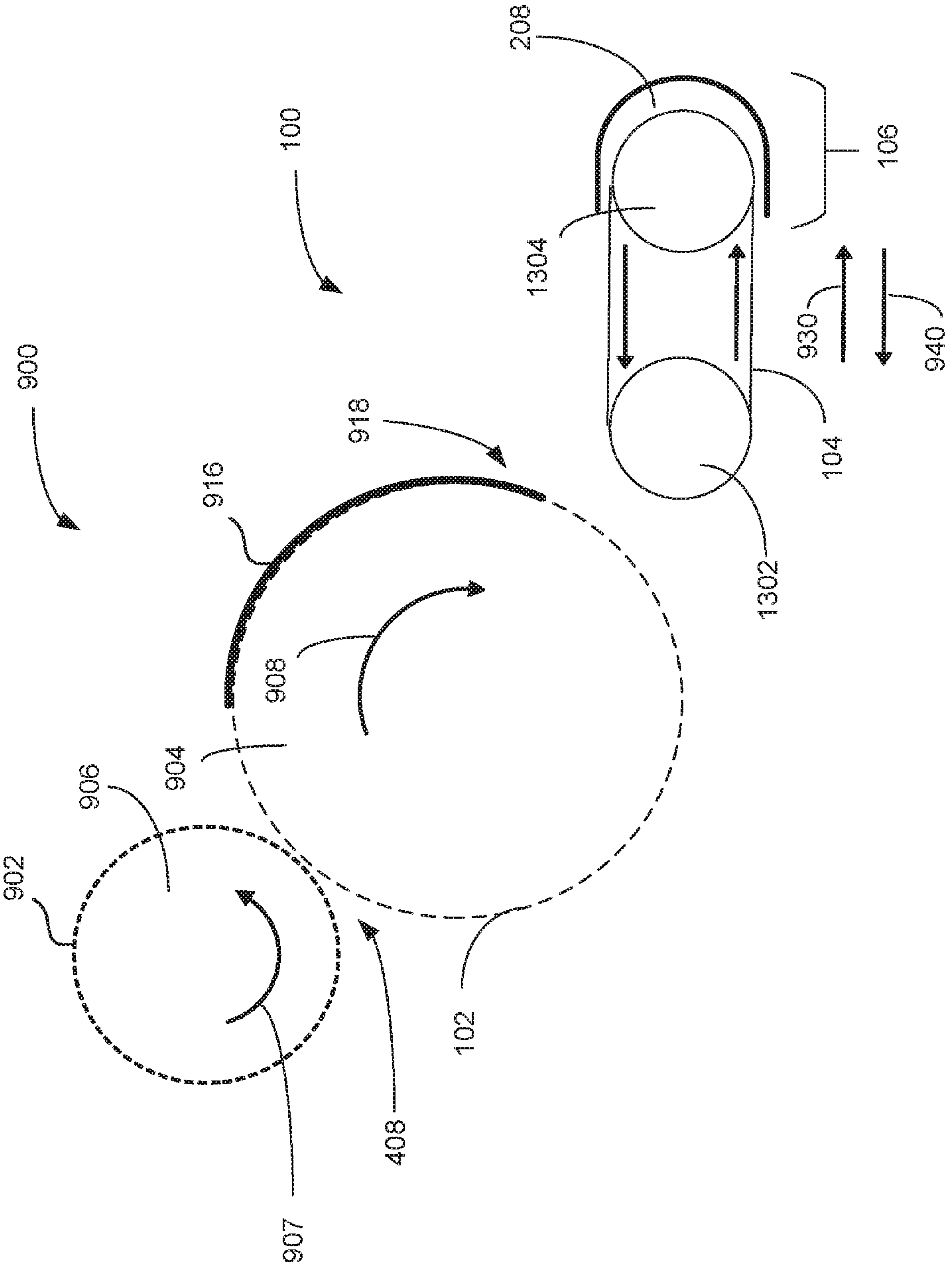

FIGS. 13 and 14 are simple schematic diagrams that illustrate another example of a print apparatus with an intermediate transfer member cleaning system 100. The print apparatus 900 and system 100 at FIGS. 13 and 14 are substantially the same as the print apparatus 900 and system 100 of FIGS. 9 and 10 discussed above, except that here the RECS 104 is in the form of a sheet metal belt or web supported by multiple rollers. In other examples, the RECS 104 web or belt may be or include a non-metallic surface that does not deform at the temperatures achieved in causing the residue to turn to an ash. Starting at FIG. 13, a first support roller 1302 and second support roller 1304 are movable in a first direction 930 to cause at least a portion of the RECS 104 to move to enter a chamber of the pyrolysis station 106, and the first support roller and the second support roller are movable in a second direction 940 to cause the RECS to contact the blanket 102 for cleaning the blanket.

Moving to FIG. 14, in this view the first support roller 1302 has been moved, relative to the view of FIG. 13, in the first direction 930 and has caused the RECS 104 to move away from the blanket 102 such that at least a portion of the RECS 104 is to enter the chamber 208 of the pyrolysis station 106. In this example, the pyrolysis station 106 does not include any doors to seal the chamber 208, as the moving of the first 1302 and second 1304 support rollers towards the chamber 208 of the pyrolysis station causes at least a portion of the RECS 104 to be at least partially encapsulated by within the chamber 208. In this example, the structure of the second support roller 1304 serves to at least partially seal chamber 208 of the pyrolysis station 106, such that effective pyrolytic heating of the at least a portion of the RECS 104 to convert residue contained on the RECS 104 to ash can occur.

FIG. 13 depicts the RECS 104 in a residue collection position wherein the RECS is engaged or can engage with the blanket 102 to receive a residue from the blanket. FIG. 14 depicts the RECS 104 in a pyrolysis position wherein the RECS is at least partially enclosed within the chamber 208 of the pyrolysis station 106.

Figure 15:
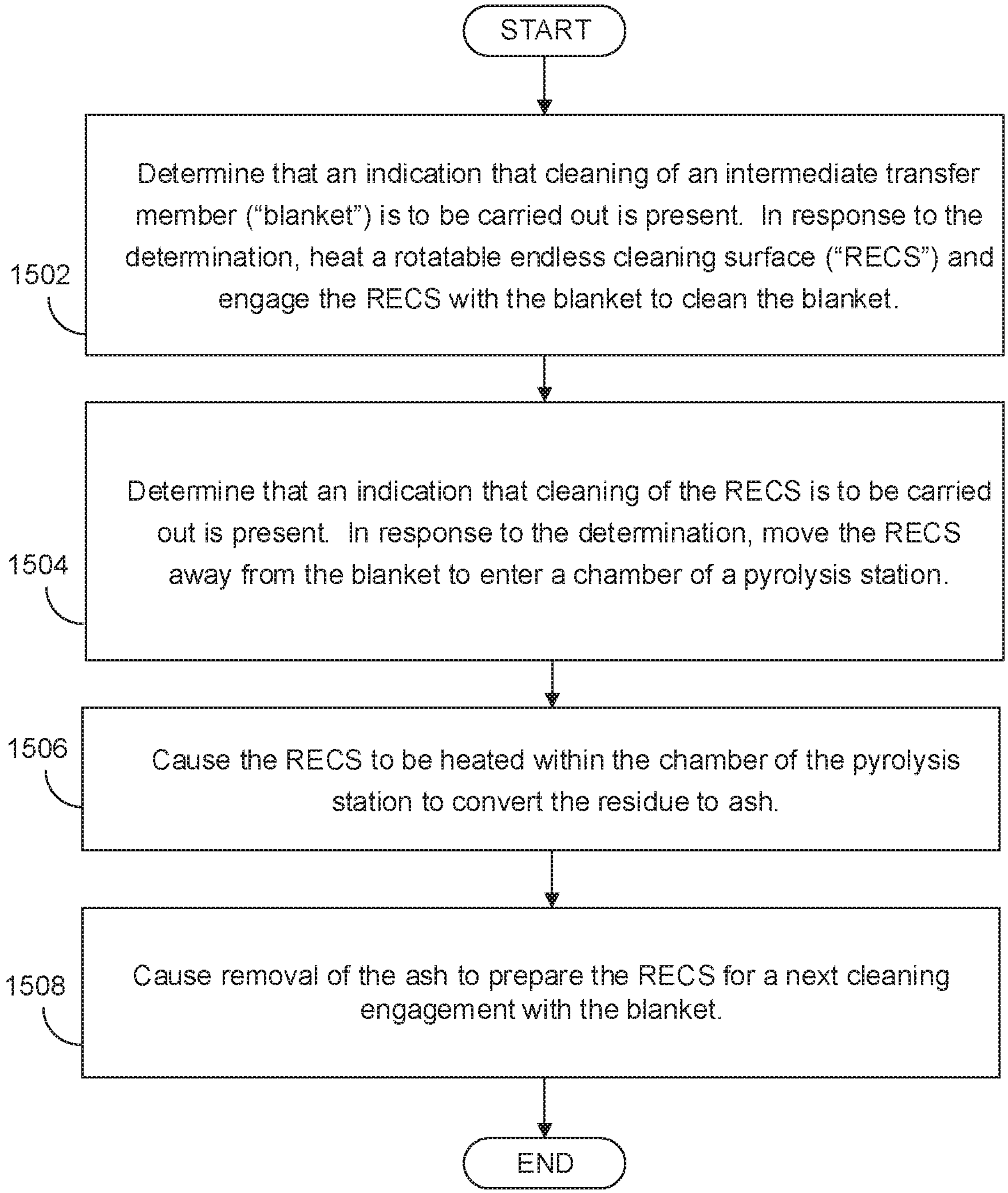
FIG. 15 is a flow diagram depicting an example implementation of a method for cleaning an intermediate transfer member.

FIG. 15 is a flow diagram of implementation of a method for cleaning blankets utilizing thermoplastic print agent during printing. In discussing FIG. 15, reference may be made to the components depicted in FIGS. 7 and 8. Such reference is made to provide contextual examples and not to limit the manner in which the method depicted by FIG. 15 may be implemented. It is determined that an indication that cleaning of an intermediate transfer member blanket is to be carried out is present. In response to the determination, a rotatable endless cleaning surface is heated, and the RECS is engaged with the blanket to clean the blanket (block 1502). Referring back to FIGS. 7 and 8, blanket cleaning determination engine 720 (FIG. 7) or blanket cleaning determination module 820 (FIG. 8), when executed by processing resource 890, may be responsible for implementing block 1502.

It is determined that an indication that cleaning of the RECS is to be carried out is present. In response to the determination RECS is moved away from the blanket to enter a chamber of a pyrolysis station (block 1504). Referring back to FIGS. 7 and 8, RECS cleaning determination engine 730 (FIG. 7) or RECS determination module 830 (FIG. 8), when executed by processing resource 890, may be responsible for implementing block 1504.

The RECS is caused to be heated within a chamber of the pyrolysis station to convert the residue to ash (block 1506). Referring back to FIGS. 7 and 8, heating engine 750 (FIG. 7) or heating module 850 (FIG. 8), when executed by processing resource 890, may be responsible for implementing block 1506.

Removal of the ash is caused to prepare the RECS for a next cleaning engagement with the blanket (block 1508). Referring back to FIGS. 7 and 8, ash removal engine 760 (FIG. 7) or ash removal module 860 (FIG. 8), when executed by processing resource 890, may be responsible for implementing block 1508.

FIGS. 1-15 aid in depicting the architecture, functionality, and operation of various examples. In particular, FIGS. 1-14 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagram of FIG. 15 shows specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. An intermediate transfer member cleaning system comprising:

an intermediate transfer member ("blanket") to receive a thermoplastic print agent from a photoconductive element;

a rotatable endless cleaning surface, wherein the rotatable endless cleaning surface can be positioned to rotatably engage with the blanket to transfer a residue of the thermoplastic print agent from the blanket to the endless cleaning surface;

wherein the rotatable endless cleaning surface can be moved away from the blanket to enter a pyrolysis station; and the pyrolysis station, for receiving the rotatable endless cleaning surface, for heating the rotatable endless cleaning surface to convert the residue to ash, and for removing the ash.

2. The intermediate transfer member cleaning system of claim 1, wherein the rotatable endless cleaning surface is a roller that is rotatably mounted upon a roller axis, and wherein axis is movable in a first direction to cause the roller to move away from the blanket and into the pyrolysis station, and is movable in a second direction to cause the roller to move from the pyrolysis station to rotatably engage with the blanket.

3. The intermediate transfer member cleaning system of claim 1, wherein the rotatable endless cleaning surface is a cleaning element that is rotatably mounted upon a first roller and a second roller;

wherein the first and second rollers are movable in a first direction to cause the rotatable endless cleaning surface to move away from the blanket to enter a chamber of the pyrolysis station, and the first and second rollers are movable in a second direction to cause the rotatable endless cleaning surface to move to contact the blanket.

4. The intermediate transfer member cleaning system of claim 1, wherein the pyrolysis station includes a chamber and a heating element positioned within the chamber, the heating element for converting the residue to ash while the rotatable endless cleaning surface is within the chamber.

5. The intermediate transfer member cleaning system of claim 1, wherein the pyrolysis station includes a chamber with a door, and wherein a heating element is positioned within the door, the heating element for converting the residue to ash while the rotatable endless cleaning surface is within the chamber.

6. The intermediate transfer member cleaning system of claim 1, wherein the rotatable endless cleaning surface is a surface that has been heated to between 100 degrees C. and 200 degrees C. during a residue collection mode.

7. The intermediate transfer member cleaning system of claim 1, wherein the rotatable endless cleaning surface to be heated to a temperature between 400 degrees C. and 600 degrees C. during a pyrolysis mode.

8. The intermediate transfer member cleaning system of claim 1, wherein a surface of the rotatable endless cleaning surface includes a coating of a catalytic material.

9. The intermediate transfer member cleaning system of claim 7, wherein the rotatable endless cleaning surface with the coating of catalytic material is to be heated to a temperature between 300 degrees C. and 500 degrees C. during a pyrolysis mode.

10. The intermediate transfer member cleaning system of claim 1, wherein the pyrolysis station includes a chamber with a door, the door to be opened to allow the rotatable endless cleaning surface to be received into the chamber, and the door to be closed to at least partially enclose the rotatable endless cleaning surface within the chamber during the time the rotatable endless cleaning surface is heated to convert the residue to ash.

11. The intermediate transfer member cleaning system of claim 1, wherein the pyrolysis station includes an ash evacuation component for removing at least a portion of the ash that has formed upon the rotatable endless cleaning surface during the heating of the rotatable endless cleaning surface at the pyrolysis station.

12. A method for cleaning an intermediate transfer member, comprising:

determining that an indication that cleaning of an intermediate transfer member ("blanket") is to be carried out is present, and in response:

heat an endless cleaning surface; and engage the endless cleaning surface with the blanket to clean the blanket;

determining that an indication that cleaning of the endless cleaning surface is to be carried out is present, and in response move the endless cleaning surface away from the blanket to enter a chamber of a pyrolysis station;

causing the endless cleaning surface to be heated within a chamber of the pyrolysis station to convert the residue to ash; and causing removal of the ash to prepare the endless cleaning surface for a next cleaning engagement with the blanket.

13. A print apparatus comprising:

a photoconductive surface;

an intermediate transfer member ("blanket") to receive thermoplastic print agent from the photoconductive surface;

an endless cleaning surface that can be moved to a residue collection position wherein the endless cleaning surface can engage with the blanket to receive a residue from the blanket, and to a pyrolysis position wherein the endless cleaning surface is within a chamber of a pyrolysis station; and the pyrolysis station, the pyrolysis station including the chamber, a heating element for converting the residue to an ash, and an ash evacuation component for removing the ash from the endless cleaning surface.

14. The print apparatus of claim 13, wherein the pyrolysis station includes the chamber with a door, the door to be opened to allow the endless cleaning surface to be received into the chamber, and the door to be closed to at least partially enclose the endless cleaning surface within the chamber during the time the endless cleaning surface is heated to convert the residue to ash.

15. The print apparatus of claim 13, wherein the ash evacuation component includes at least one from the set of a blower apparatus, a vacuum apparatus, and an air knife apparatus.

* * * * *